(12) United States Patent
Yasumoto et al.

(10) Patent No.: US 10,924,265 B2
(45) Date of Patent: Feb. 16, 2021

(54) BLOCKCHAIN TECHNOLOGY

(71) Applicant: INTERNATIONAL BUSINESS MACHINES CORPORATION, Armonk, NY (US)

(72) Inventors: Chikafumi Yasumoto, Tokyo (JP); Yutaka Oishi, Kawasaki (JP); Munetaka Ohtani, Fujisawa (JP); Jiayun Zhu, Edogawa-ku (JP); Kumiko Maeda, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 488 days.

(21) Appl. No.: 15/821,377

(22) Filed: Nov. 22, 2017

(65) Prior Publication Data
US 2019/0158273 A1  May 23, 2019

(51) Int. Cl.
*H04L 9/06* (2006.01)
*H04L 29/06* (2006.01)
*H04L 9/32* (2006.01)

(52) U.S. Cl.
CPC .......... *H04L 9/0637* (2013.01); *H04L 9/3239* (2013.01); *H04L 63/0428* (2013.01); *H04L 63/123* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2017/0228371 A1* | 8/2017 | Seger, II | G06F 16/2379 |
| 2018/0343111 A1* | 11/2018 | Chen | G06F 21/60 |

OTHER PUBLICATIONS

Marc Sel, et al.; Blockchain and its Application in Financial Services; ISSE Conference; 2016; PwC; 9 pages.
Ashish Khandekar; "Blockchain Congestion—A Solution and Pre-Emptive Measures for the Future"; http://bitcoin-development.narkive.com; 3 pages.
Satoshi Nakamoto; "Bitcoin: A Peer-toPeer Electronic Cash System"; www.bitcoin.org; 9 pages.

* cited by examiner

*Primary Examiner* — Brian Whipple
(74) *Attorney, Agent, or Firm* — Fabian VanCott; Steven L. Nichols

(57) ABSTRACT

Provided is a method for storing at least a portion of data registered in a blockchain in each of a plurality of node apparatuses, including selection of selecting whether to store data included in a block in one node apparatus among the plurality of node apparatuses, according to a characteristic of the one node apparatus; and data storage of storing at least a portion of the data included in the block in the one node apparatus, according to a result of the selection.

20 Claims, 8 Drawing Sheets

| NODE NUMBER | 1 | 2 | 3 | 4 | 5 | 6 | 7 | 8 | 9 | 10 | Total |
|---|---|---|---|---|---|---|---|---|---|---|---|
| REGISTERED DATA AMOUNT | 10 | 9 | 8 | 7 | 6 | 5 | 4 | 3 | 2 | 1 | 55 |
| STORED DATA AMOUNT | 30 | 27 | 24 | 21 | 18 | 15 | 12 | 9 | 6 | 3 | 165 |
| COMPARISON TO CONVENTIONAL ART (%) | 55 | 49 | 44 | 38 | 33 | 27 | 22 | 16 | 11 | 5 | 30 |

FIG. 4

| NODE NUMBER | 1 | 2 | 3 | 4 | 5 | 6 | 7 | 8 | 9 | 10 | Total |
|---|---|---|---|---|---|---|---|---|---|---|---|
| REGISTERED DATA AMOUNT | 40 | 15 | 10 | 5 | 5 | 1 | 1 | 1 | 1 | 1 | 80 |
| STORED DATA AMOUNT | 80 | 60 | 40 | 20 | 20 | 4 | 4 | 4 | 4 | 4 | 240 |
| COMPARISON TO CONVENTIONAL ART (%) | 100 | 75 | 50 | 25 | 25 | 5 | 5 | 5 | 5 | 5 | 30 |

FIG. 5

| NODE NUMBER | 1 | 2 | 3 | 4 | 5 | 6 | 7 | 8 | 9 | 10 | Total |
|---|---|---|---|---|---|---|---|---|---|---|---|
| REGISTERED DATA AMOUNT | 54 | 0 | 0 | 0 | 0 | 0 | 0 | 0 | 0 | 0 | 54 |
| STORED DATA AMOUNT | 54 | 12 | 12 | 12 | 12 | 12 | 12 | 12 | 12 | 12 | 162 |
| COMPARISON TO CONVENTIONAL ART (%) | 100 | 22 | 22 | 22 | 22 | 22 | 22 | 22 | 22 | 22 | 30 |

FIG. 6

BLOCKCHAIN TECHNOLOGY

BACKGROUND

1. Technical Field

The present invention relates to blockchain technology.

2. Related Art

Conventionally, in a system that adopts a blockchain, blocks of one or more pieces of data are stored in each node.

SUMMARY

According to a first aspect of the present invention, provided is a computer-implemented method for storing at least a portion of data registered in a blockchain in each of a plurality of node apparatuses, including selection of selecting whether to store data included in a block in one node apparatus among the plurality of node apparatuses, according to a characteristic of the one node apparatus, and data storage of storing at least a portion of the data included in the block in the one node apparatus, according to a result of the selection.

According to a second aspect of the present invention, provided is a system that stores at least a portion of data registered in a blockchain in each of a plurality of node apparatuses, comprising a processor and a computer program product for storing at least a portion of the data registered in the blockchain in each of the plurality of node apparatuses. The computer program product includes a computer readable storage medium having program instructions embodied therewith, the program instructions executable by a device to cause the device to perform operations comprising selecting whether to store data included in a block in one node apparatus among the plurality of node apparatuses, according to a characteristic of the one node apparatus; and storing at least a portion of the data included in the block in the one node apparatus, according to a result of the selection.

According to a third aspect of the present invention, provided is a computer program product for storing at least a portion of data registered in a blockchain in each of a plurality of node apparatuses, the computer program product comprising a computer readable storage medium having program instructions embodied therewith, the program instructions executable by a device to cause the device to perform operations comprising selecting whether to store data included in a block in one node apparatus among the plurality of node apparatuses, according to a characteristic of the one node apparatus; and storing at least a portion of the data included in the block in the one node apparatus, according to a result of the selection.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 4 shows a detailed example of the allocation amount.

FIG. 5 shows a detailed example of the allocation amount.

FIG. 6 shows a detailed example of the allocation amount.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

1. Configuration of the System

Figure 1:
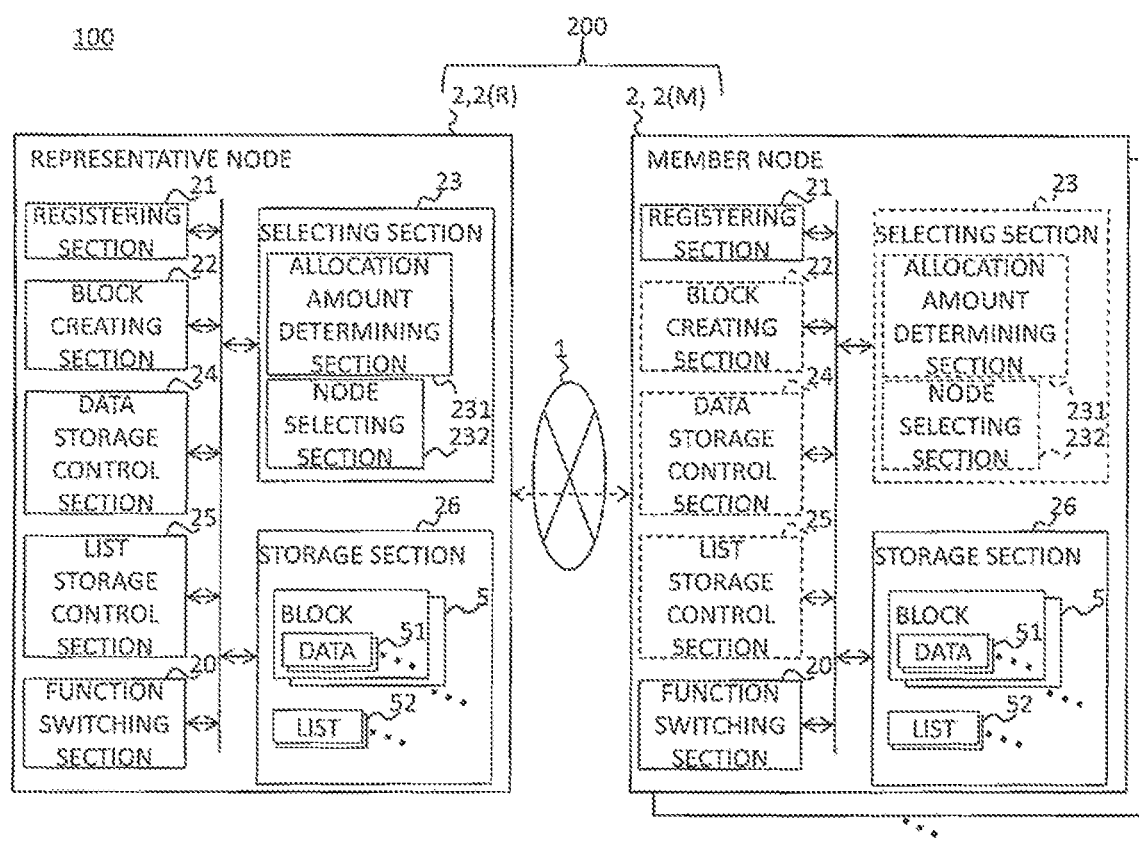
FIG. 1 shows a system according to the present embodiment.

FIG. 1 shows a system 100 according to an embodiment of the present invention.

The system 100 stores, in each of a plurality of node apparatuses 2, at least a portion of one or more pieces of data registered in each block 5 of a blockchain. The system 100 may be applied to Bitcoin, Watson Health Cloud, or the like. The system 100 includes one or more networks 1 and a plurality of node apparatuses 2. As an example in the present embodiment, the system 100 may be configured as a graph structure with an arbitrary shape, by a plurality of edges formed by a plurality of the networks 1 and a plurality of the node apparatuses 2.

1-1. Network

The one or more networks 1 may be configured to include various networks such as the Internet, a wide area network (WAN), a local area network, or a combination thereof. The network 1 may include a connection formed by at least one of a wired network and a wireless network, at each connection point. The network distance between each set of two node apparatuses 2 may be different.

1-2. Nodes

The node apparatuses 2 store each block 5 of the blockchain. If the system 100 is used for Bitcoin, for example, each node apparatus 2 may be established by a bank or securities company. If the system 100 is used for Watson Health Cloud, each node apparatus 2 may be established by a university, pharmaceutical company, medical institution, research facility, or the like.

The node apparatuses 2 may form a blockchain cluster 200. The present embodiment describes an example in which the number of node apparatuses 2 included in the blockchain cluster 200 is n, but the number of node apparatuses 2 may fluctuate. Each node apparatus 2 includes a function switching section 20, a registering section 21, a block creating section 22, a selecting section 23, a data storage control section 24, a list storage control section 25, and a storage section 26.

1-2(1). Function Switching Section

The function switching section 20, by switching the function of its own node apparatus 2, sets this node apparatus 2 to be a representative node apparatus 2(R) or a member node apparatus 2(M). Here, the representative node apparatus 2(R) is a node apparatus 2 that creates a block 5, and one representative node apparatus 2(R) is included in the blockchain cluster 200. Member node apparatuses 2(M) are node apparatuses 2 other than the representative node apparatus 2(R) among the node apparatuses 2 included in the blockchain cluster 200. As an example in the present embodiment, the function switching section 20 sets its own node apparatus 2 to be the representative node apparatus 2(R), according to an order determined among the plurality of node apparatuses 2. If the node apparatus 2 including this function switching section 20 is the first to be mined in the blockchain cluster 200, the function switching section 20 may set this node apparatus 2 to be the representative node apparatus 2(R).

If the node apparatus 2 including this function switching section 20 is to function as the representative node apparatus 2(R), the function switching section 20 may enable the block creating section 22, the selecting section 23, the data storage control section 24, and the list storage control section 25, which are described further below. Furthermore, if the node apparatus 2 including this function switching section 20 is to function as a member node apparatus 2(M), the function switching section 20 may disable these sections. It should be noted that, in FIG. 1, the enabled functional sections are indicated by solid lines and the disabled functional sections are indicated by dashed lines.

1-2(2). Registering Section

The registering section 21 requests registration of one or more pieces of data 51 in the block 5. The registering section 21 may transmit the data 51 for which registration has been requested to the block creating section 22 of the representative node apparatus 2(R).

Here, if the system 100 is used for Bitcoin, the data 51 may relate to a transaction. If the system 100 is used for Watson Health Cloud, the data 51 may relate to a patient or a disease. The data 51 may be sequentially supplied from an external data editing apparatus (not shown), or may be generated within the node apparatuses 2. The data 51 may be sorted according to each type of target content, e.g. each transaction or each patient. Each piece of data 51 may have a different size, or may have the same size. The data 51 may be sorted according to unit amounts, regardless of the content.

1-2(3). Block Creating Section

The block creating section 22 creates a block 5 by collecting the data 51 for which registration was requested by the registering section 21 of each node apparatus 2. The created block 5 may include at least one or more pieces of data 51 registered by each node apparatus 2 and a hash (not shown) of each piece of data 51 for detecting tampering. The block creating section 22 may supply the data storage control section 24 with the created block 5. The block creating section 22 may supply the selecting section 23 with identification information for the data 51 registered by each node apparatus 2 and the amount of this data 51, along with identification information for the node apparatus 2 that is the source of the registration. The amount of data 51 may be the size of the data 51.

1-2(4). Selecting Section

The selecting section 23 selects whether to store the data 51 included in the block 5 in one node apparatus 2 among the plurality of node apparatuses 2, according to a characteristic of this one node apparatus 2. Furthermore, the selecting section 23 may select whether to store the data 51 included in the block 5 in each node apparatus 2, according to the characteristics of this node apparatus 2.

Here, the characteristics of a node apparatus 2 may be the amount of data 51 being registered and/or the communication response time, for example. The amount of data 51 being registered is the amount of data 51 being registered in one block 5 in the present embodiment, but may instead be the amount of data 51 registered in all of the blocks 5 of the blockchain. Furthermore, the data 51 included in the block 5 may be data 51 registered as being included in the block 5, and does not necessarily need to be stored in a block 5 in the node apparatus 2. The selecting section 23 includes an allocation amount determining section 231 and a node selecting section 232.

The allocation amount determining section 231 determines an allocation amount of the data 51 to be stored by the node apparatus 2, according to the amount of data 51 registered by each node apparatus 2. The allocation amount determining section 231 may supply the node selecting section 232 with the allocation amount of each node apparatus 2.

The node selecting section 232 selects from among the plurality of node apparatuses 2, for each piece of data 51 included in the block 5, a plurality of storage node apparatuses 2 to store this data 51. The node selecting section 232 may supply the data storage control section 24 and the list storage control section 25 with the data 51 and the identification information for the storage node apparatuses 2.

1-2(5). Data Storage Control Section

The data storage control section 24 stores at least a portion of the data 51 included in the block 5 in its own representative node apparatus 2(R), according to the selection results of the selecting section 23. Furthermore, the data storage control section 24 may store each piece of data 51 included in the block 5 in one or more member storage node apparatuses 2(M), among the plurality of node apparatuses 2, that are to store these pieces of data 51.

1-2(6). List Storage Control Section

The list storage control section 25 creates, for each piece of data 51 included in the block 5, a list 52 of storage node apparatuses 2 for this data 51. Furthermore, the list storage control section 25 stores the created list 52 in association with the block 5, in at least one node apparatus 2 among the plurality of node apparatuses 2.

1-2(7). Storage Section

The storage section 26 stores each block 5 of the blockchain and the list 52 of the storage destination for each piece of data 51. In the present embodiment, the storage sections 26 of the node apparatuses 2 each store at least a portion of the one or more pieces of data 51 registered in the block 5. For example, the storage sections 26 of one or more node apparatuses 2 store one piece of data 51 registered in the block 5, and the storage sections 26 of one or more other node apparatuses 2 store other pieces of data 51. Therefore, the pieces of data 51 stored in the same block 5 may be different among the storage sections 26 of a plurality of node apparatuses 2. It should be noted that a hash (not shown) of all of the data 51 registered in a block 5 stored by a storage section 26 may be included is this block 5. The list 52 may be registered in association with the block 5, included in a header or the like of the block 5 to be stored, for example, or stored separately from the block 5.

With the system 100 described above, the selection concerning whether to store one or more pieces of data 51 included in the block 5 is made according to the characteristics of the node apparatuses 2. Accordingly, compared to a case where the data 51 is stored without consideration of the characteristics of the node apparatuses 2, it is possible to reduce the load occurring when the data 51 is stored and/or referenced. Furthermore, since the list 52 of storage node apparatuses 2 is created for each piece of data 51, it is possible for a node apparatus 2 that does not store a piece of data 51 to reference this piece of data 51.

Furthermore, since the allocation amount of data 51 to be stored by each node apparatus 2 is determined according to the amount of data 51 registered by this node apparatus 2, it is possible to achieve a balance between the amount of data 51 that is registered and the amount of data 51 that is stored.

2. Outline of the Block Storage Method

Figure 2:
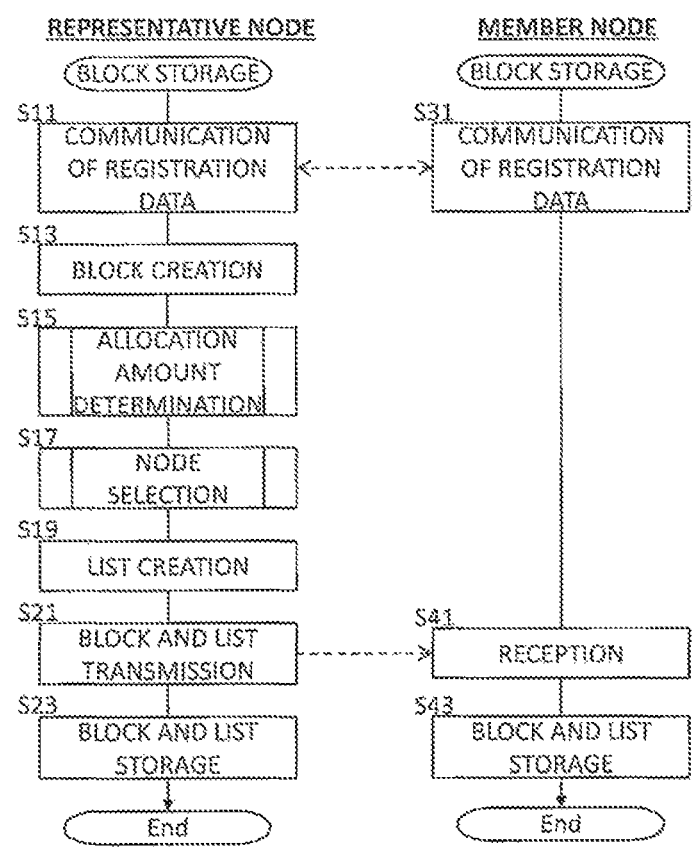
FIG. 2 shows a block storage method according to the present embodiment.

FIG. 2 shows a block storage method performed by the system 100. By performing the process of steps S11 to S23 and S31 to S43, the system 100 stores at least a portion of the data 51 registered in the blockchain in each of the plurality of node apparatuses 2.

First, at steps S11 and S31, the registering section 21 of each node apparatus 2 communicates the data 51 to be registered to the blockchain. For example, the registering section 21 of the member node apparatus 2(M) may transmit the data 51 to be registered to the registering section 21 of the representative node apparatus 2(R). The process of steps S11 and S31 may be performed at prescribed intervals, e.g. every 10 minutes.

Next, at step S13, the block creating section 22 of the representative node apparatus 2(R) creates the block 5 by collecting the data 51 for which registration has been requested by the registering section 21 of each node apparatus 2.

Next, at steps S15 and S17, the selecting section 23 selects whether to store the data 51 included in the block 5 in one node apparatus 2, e.g. the representative node apparatus 2(R), among the plurality of node apparatuses 2, according to the characteristics of this one node apparatus 2. As an example in the present embodiment, the selecting section 23 selects whether to store the data 51 included in the block 5 in each node apparatus 2, according to the characteristics of this node apparatus 2.

For example, at step S15, the allocation amount determining section 231 determines the allocation amount of the data 51 to be stored in each node apparatus 2, according to the amount of data 51 registered by this node apparatus 2.

Furthermore, at step S17, the node selecting section 232 selects, for each piece of data 51 included in the block 5, a plurality of storage node apparatuses 2, from among the plurality of node apparatuses 2, to store this piece of data 51. As an example, the node selecting section 232 may select at least a number of storage node apparatuses 2 corresponding to the multiplicity caused by multiplexing, for each piece of data 51. Here, the multiplexing may be storing data 51 in separate node apparatuses 2, in order to improve the resistance to damage caused by natural disasters or the like and/or to distribute the load. The multiplicity may be an integer greater than or equal to 2.

Next, at step S19, the list storage control section 25 creates the list 52 of storage node apparatuses 2 that store the data 51, for every piece of data 51 included in the block 5, according to the selection results of the node selecting section 232.

Next, at step S21, the data storage control section 24 transmits the created block 5 to the member node apparatuses 2(M). In this way, the data storage control section 24 stores each piece of data 51 included in the block 5 in the one or more member storage node apparatuses 2(M) to store this data 51 among the plurality of node apparatuses 2. Furthermore, the data storage control section 24 may transmit the block 5 to the storage section 26 in the same node apparatus 2. In this way, the data storage control section 24 stores, in its own node apparatus 2, at least a portion of the data 51 included in the block 5, according to the selection results of the selecting section 23.

The data storage control section 24 may include just the data 51 to be stored in the block 5 when performing transmission. Instead, the data storage control section 24 may include all of the data 51 in the block 5 when performing transmission. In this case, the reception side may store the data 51 selected according to the list 52. Furthermore, the data storage control section 24 may transmit the header portion of the blocks, without transmitting the data 51. In this case, the member node apparatus 2(M) on the reception side may acquire the data 51 to be stored in this node apparatus 2 from the node apparatus 2 that is the source of the registration, according to the list 52.

Furthermore, the list storage control section 25 may store at least the created list 52 in association with the block 5 in at least one of the node apparatuses 2. For example, the list storage control section 25 may store a list 52 concerning one piece of data 51 for each node apparatus 2 that does not store this one piece of data 51, among the plurality of node apparatuses 2. Instead, the list storage control section 25 may store a list 52 concerning each piece of data 51 in each node apparatus 2. The list storage control section 25 may store the lists 52 outside of the blockchain cluster 200.

On the other hand, at step S41, the member node apparatus 2(M) may receive the block 5 and the list 52 from representative node apparatus 2(R).

Then, at steps S23 and S43, the storage section 26 of each node apparatus 2 may store the block 5 that includes the data 51 to be stored in its own node apparatus 2 and the list 52 corresponding to this block 5.

2-1. Description of the Allocation Amount Determination

Figure 3:
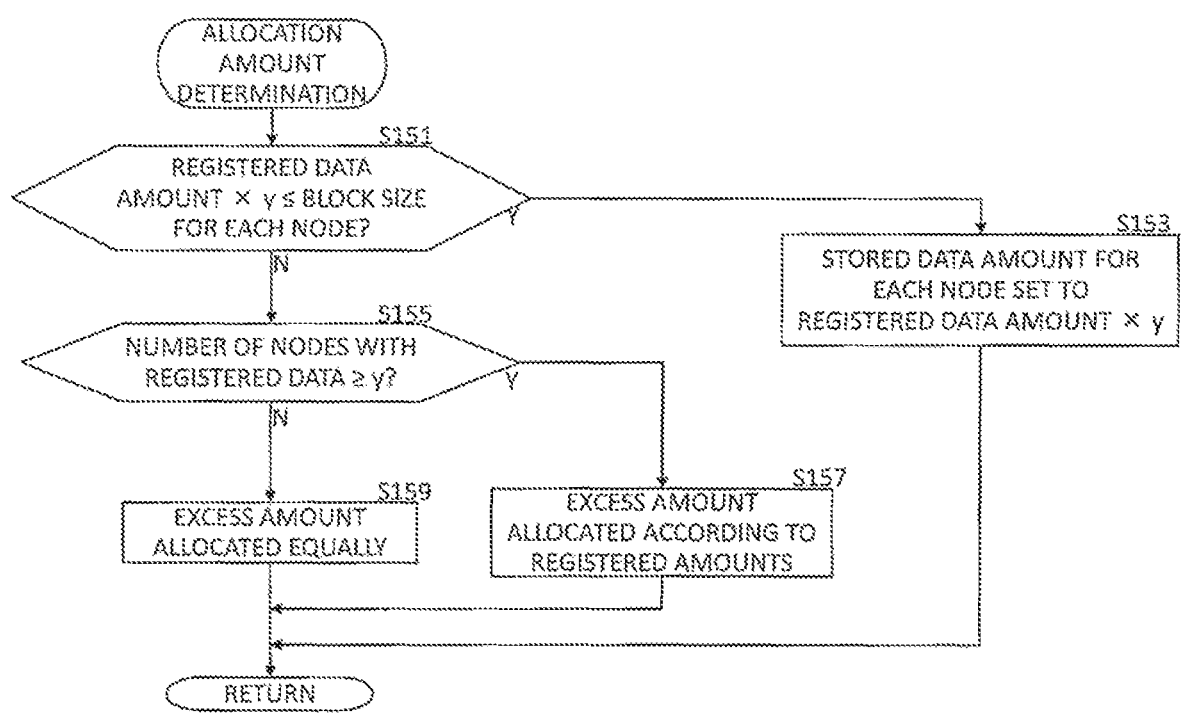
FIG. 3 shows an allocation amount determination.

FIG. 3 shows the allocation amount determination of step S15. By performing the process from step S151 to S159, the allocation amount determining section 231 determines the allocation amount of the data 51 to be stored by each node apparatus 2, according to the amount of data 51 registered by this node apparatus 2.

First, at step S151, the allocation amount determining section 231 may calculate a tentative allocation amount for each node apparatus 2 as the product of the amount of data 51 being registered and the multiplicity resulting from the multiplexing, and may judge whether this tentative allocation amount is less than or equal to an upper limit data amount. As one example, with the multiplicity being y and the amount of data 51 being registered by the k-th node apparatus 2 (where k is such that 1 (k(n) in the blockchain cluster 200 being $DS_k$, the tentative allocation amount may be as shown in Expression 1. The node apparatuses 2 may be ordered from the largest data amount to be registered. Furthermore, the upper limit data amount may be the data amount of the block 5, i.e. the data amount of all of the data 51 included in the block 5. As one example, the upper limit data amount may be as shown in Expression 2.

$$\text{TENTATIVE ALLOCATION AMOUNT} = DS_k \times y \qquad \text{Expression 1}$$

$$\text{UPPER LIMIT DATA AMOUNT} = \Sigma_{k=1}^{n} DS_k \qquad \text{Expression 2}$$

If the judgment result at step S151 is affirmative, the allocation amount determining section 231 may move the process to step S153. If the judgment result at step S151 is negative, the allocation amount determining section 231 may move the process to step S155.

At step S153, the allocation amount determining section 231 confirms the tentative allocation amount for each node apparatus 2 as the allocation amount. When the process of step S153 has ended, the allocation amount determining section 231 may end the allocation amount determination.

At step S155, the allocation amount determining section 231 judges whether the number of node apparatuses 2 that have registered the data 51 is greater than or equal to the multiplicity (y). If this judgment result is affirmative, the allocation amount determining section 231 may move the process to step S157. If this judgment result is negative, the allocation amount determining section 231 may move the process to step S159.

At step S157, the allocation amount determining section 231 determines the allocation amount of one node apparatus 2 for which the tentative allocation amount has exceeded the upper limit data amount to be the upper limit data amount. Along with this, the allocation amount determining section 231 adds the amount of data by which the upper limit data amount was exceeded in the one node apparatus 2 to the tentative allocation amounts of a plurality of other node apparatuses 2. The allocation amount determining section 231 may divide this excess data amount according to the amount of data 51 registered by each other node apparatus 2 and add these data amounts to the tentative allocation amounts of the other node apparatuses 2, and then confirm the allocation amounts. As one example, in a case where the tentative allocation amount of the first node apparatus 2 included in the blockchain cluster 200 exceeds the upper limit data amount, the allocation amount of the j-th node apparatus 2 (where j is such that 2 (j(n) may be as shown in Expression 3. When the process of step S157 has finished, the allocation amount determining section 231 may end the allocation amount determination.

$$\begin{aligned}\text{ALLOCATION} \atop \text{AMOUNT} &= DS_j \times y + \\ &\quad \left(DS_1 \times y \cdot \sum_{k=1}^{n} DS_k\right) \times \\ &\quad \frac{DS_j}{\sum_{k=2}^{n} DS_k} \\ &= \frac{\sum_{k=1}^{n} DS_k}{\sum_{k=2}^{n} DS_k} \times (y-1) \times \\ &\quad DS_j \end{aligned} \qquad \text{Expression 3}$$

At step S159, the allocation amount determining section 231 determines the allocation amount of one node apparatus 2 whose tentative allocation amount has exceeded the upper limit data amount to be the upper limit data amount. Along with this, the allocation amount determining section 231 adds the amount of data by which the upper limit data amount was exceeded in the one node apparatus 2 to the tentative allocation amounts of a plurality of other node apparatuses 2. The allocation amount determining section 231 may divide this excess data amount equally among the number of other node apparatuses 2 and add the divided data amounts to the tentative allocation amount of each other node apparatus 2, and then confirm the allocation amounts. As one example, if the tentative allocation amount of the first node apparatus 2 included in the blockchain cluster 200 exceeds the upper limit data amount and the amount of data 51 being registered by the second and following node apparatuses 2 is 0, the allocation amount for each of the second and following node apparatuses 2 may be as shown in Expression 4. The number of node apparatuses 2 within the blockchain cluster 200 is detected using known cluster management technology. When step S157 has ended, the allocation amount determining section 231 may end the allocation amount determination.

$$\begin{aligned}\text{ALLOCATION} \atop \text{AMOUNT} &= \frac{DS_1 \times y - \left(\sum_{k=1}^{n} DS_k\right)}{n-1} \\ &= \frac{DS_1 \times (y-1)}{n-1}\end{aligned} \qquad \text{Expression 4}$$

With the process described above, if the product of the amount of data 51 registered by a node apparatus 2 and the multiplicity, i.e. the tentative allocation amount of the node apparatus 2, is less than or equal to the upper limit data amount, this tentative allocation amount is confirmed as the allocation amount. Accordingly, it is possible to achieve a balance between the amount of data 51 registered and the amount of data 51 stored.

Furthermore, if the tentative allocation amount in one node apparatus 2 exceeds the upper limit data amount and the number of node apparatuses 2 that have registered data 51 is greater than or equal to the multiplicity (y) the excess amount of the data 51 is added to the tentative allocation amounts of a plurality of other node apparatuses 2, according to a ratio corresponding to the amount of data 51 that is registered. Accordingly, if the allocation amount in one node apparatus 2 exceeds the upper limit data amount, it is possible to achieve a balance in the other node apparatuses 2 between the amount of data 51 that is registered and the amount of data 51 that is stored.

Furthermore, if the tentative allocation amount in one node apparatus 2 exceeds the upper limit data amount and the number of node apparatuses 2 that have registered data 51 is less than the multiplicity (y), the excess amount of the data 51 is added equally to the tentative allocation amounts of a plurality of other node apparatuses 2. Accordingly, it is possible to prevent a decrease in the multiplicity resulting from the multiplexing.

Since the upper limit data amount is the data amount of the block 5, unlike a case where the upper limit data amount is less than the data amount of the block 5, it is possible to reliably store the data 51 in the node apparatus 2 even if only one node apparatus 2 registers the data 51. Furthermore, unlike a case where the upper limit data amount is greater than the data amount of the block 5, it is possible to prevent the same data 51 from being copied and stored in the same node apparatus 2.

2-1-1. Allocation Amount Examples

FIGS. 4 to 6 show detailed examples of allocation amounts. In the drawings, the "node number" is an identification number of the node apparatus 2. For the sake of simplicity in this detailed example, a description is provided in which the total number of node apparatuses 2 is 10. The "registered data amount" is the amount of data registered in one block 5. The "stored data amount" is the determined allocation amount. In these detailed examples, the multiplicity (y) resulting from the multiplexing is 3. The "comparison to conventional art" is the amount of the decrease in the amount of data 51 stored, as compared to a conventional case in which each node apparatus 2 stores all of the data 51 of the block 5. Specifically, the "comparison to conventional art" is a ratio of the "stored data amount" to all of the data of the block 5.

In the example of FIG. 4, the product of the registered data amount and the multiplicity for each node apparatus 2 is less than or equal to the block size (=55). Therefore, the stored data amount becomes the product of the registered data amount and the multiplicity, according to step S153.

In the example of FIG. 5, the product of the registered data amount and the multiplicity for the first node apparatus 2 exceeds the block size (=80), and the number of node apparatuses 2 that have registered data is greater than or equal to the multiplicity. Therefore, the stored data amount of the first node apparatus 2 becomes the block size (=80) and the excess data amount is added to the stored data amounts of the second and following node apparatuses 2 according to the registered data amounts, according to step S157.

In the example of FIG. 6, the product of the registered data amount and the multiplicity for the first node apparatus 2 exceeds the block size (=54), and the number of node apparatuses 2 that have registered data is less than the multiplicity. Therefore, the stored data amount of the first node apparatus 2 becomes the block size (=54) and the excess data amount is added equally to the stored data amounts of the second and following node apparatuses 2, according to step S159.

2-2. Description of Node Selection

Figure 7:
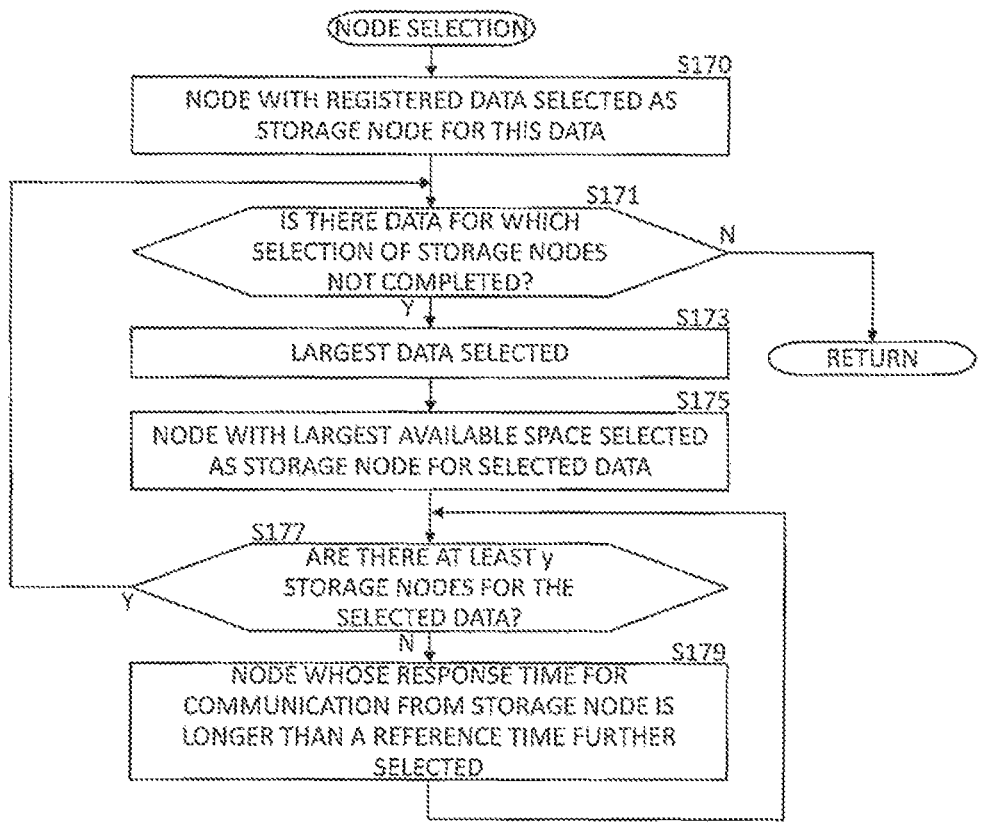
FIG. 7 shows node selection.

FIG. 7 shows the node selection of step S17. By performing the processes of steps S170 to S179, the node selecting section 232 selects, for each piece of data 51 included in the block 5, a plurality of storage node apparatuses 2 to store this data 51 from among the plurality of node apparatuses 2.

First, at step S170, the node selecting section 232 selects, as the storage node apparatus 2 for each piece of data 51 included in the block 5, the node apparatus 2 that has registered this data 51. The process of step S170 does not necessarily need to be performed. Furthermore, if the node apparatus 2 that communicated the data 51 registered at step S11 or S31 has been removed from the blockchain cluster 200, a storage node apparatus 2 does not need to be selected for this data 51 at step S170.

Next, the step S171, the node selecting section 232 judges whether there is data for which the selection of storage node apparatuses 2 has not yet been completed among the data 51 included in the block 5. As an example in the present embodiment, the node selecting section 232 may judge whether there is data 51 for which the number of selected storage node apparatuses 2 is less than the multiplicity (y) among the data 51 included in the block 5. If this judgment result is negative, i.e. if the selection of storage node apparatuses 2 has been completed for all of the data 51, the node selecting section 232 ends the node selection. If this judgment result is affirmative, the node selecting section 232 moves the process to step S173.

At step S173, the node selecting section 232 selects the largest piece of data 51 from among the one or more pieces of data 51 for which the selection of the storage node apparatuses 2 has not been completed.

Next, at step S175, the node selecting section 232 selects the node apparatus 2 with the greatest amount of available space, from among the plurality of node apparatuses 2, to be the storage node apparatus 2 for the selected data 51. Here, the available space of each node apparatus 2 in the present embodiment may be a value obtained by subtracting the amount of data 51 that is already stored in the node apparatus 2 from the allocation amount determined at step S15 for this node apparatus 2.

Next, at step S177, the node selecting section 232 judges whether the number of storage node apparatuses 2 for the selected data 51 is greater than or equal to the multiplicity (y). If this judgment result is affirmative, the node selecting section 232 moves the process to step S171. If this judgment result is negative, the node selecting section 232 moves the process to step S179.

At step S179, the node selecting section 232 selects, as the storage node apparatus 2 for the selected data 51, a node apparatus 2 whose response time for the communication with each storage node apparatus 2 for which this data 51 has been selected is longer than a reference response time. Instead, the node selecting section 232 may select, as the storage node apparatus 2, a node apparatus 2 whose response time for the communication with each storage node apparatus 2 for which this data 51 has been selected is longer than the reference response time and whose available space is largest.

Here, the response time for the communication between a storage node apparatus 2 and another node apparatus 2 may be determined according to the network distance between the storage node apparatus 2 and the other node apparatus 2 and/or the processing capability of the CPU, memory, and the like of the other node apparatus 2. The response time for the communication between each node apparatus 2 may be measured in advance and stored in the node selecting section 232.

The reference response time may be set arbitrarily through trial and error. In the interest of improving the damage resistance, the reference response time may be set to the minimum response time needed when communication is performed between different geographical regions, prefectures, or cities.

When the process of step S179 has ended, the node selecting section 232 moves the process to step S177. In this way, for each piece of data 51, a number of storage node apparatuses 2 at least equal to the multiplicity (y) resulting from the multiplexing are selected. In the interest of improving the damage resistance, the multiplicity may be set to a value larger than the value necessary for the multiplexing, in order to provide a tolerance.

With the process described above, as the storage node apparatuses 2 for each piece of data 51, the node apparatus 2 that has registered this data 51 is selected. Accordingly, it is possible to achieve a balance between the amount of data 51 that is registered and the amount of data 51 that is stored.

Furthermore, the node apparatus 2 with the largest amount of available space is selected as the storage node apparatus 2 for the largest piece of data 51 for which the selection of the storage node apparatuses 2 has not been completed. Accordingly, it is possible to reliably store each piece of data 51 in a node apparatus 2.

Furthermore, a node apparatus 2 whose response time for the communication with each storage node apparatus 2 for which a piece of data 51 has been selected is longer than the reference response time is selected as the storage node apparatus 2 for this piece of data 51. Accordingly, it is possible to distribute and store each piece of data 51, thereby improving the damage resistance.

3. Data Reading Method

Figure 8:
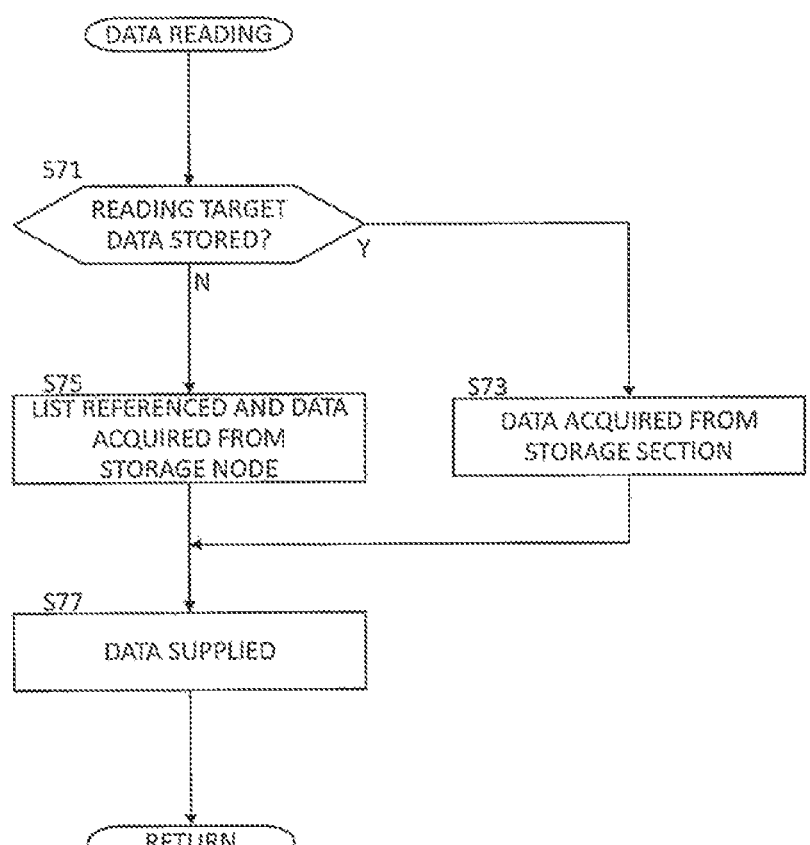
FIG. 8 shows a data reading method.

FIG. 8 shows a method for reading the data 51 performed by a node apparatus 2. By performing the process from steps S71 to S77 when a request to read any one piece of data 51 is received, the node apparatus 2 supplies the target data 51 to the source of the request. The reading request may be performed by a user of this node apparatus 2, or may be performed by another node apparatus 2.

First, at step S71, the node apparatus 2 judges whether the target data 51 is stored in this node apparatus 2. If this judgment result is affirmative, the node apparatus 2 moves the process to step S73. If this judgment result is negative, the node apparatus 2 moves the process to step S75.

At step S73, the node apparatus 2 acquires the target data 51 from the storage section 26.

At step S75, the node apparatus 2 references the list 52 and specifies a node apparatus 2 that stores the target data 51, and also acquires the target data 51 from this node apparatus 2. For example, the node apparatus 2 may acquire the target data 51 from the node apparatus 2 whose response time for communicating with the node apparatus 2 performing the acquisition is shortest, among the plurality of node apparatuses 2 that store the target data 51.

Then, at step S77, the node apparatus 2 supplies the acquired data 51 to the source of the request. For example, the node apparatus 2 may display the data 51 to the user of the source of the request. Furthermore, the node apparatus 2 may transmit the data 51 to the node apparatus 2 that is the source of the request.

4. Modification

4-1. Node Selection Modification

Figure 9:
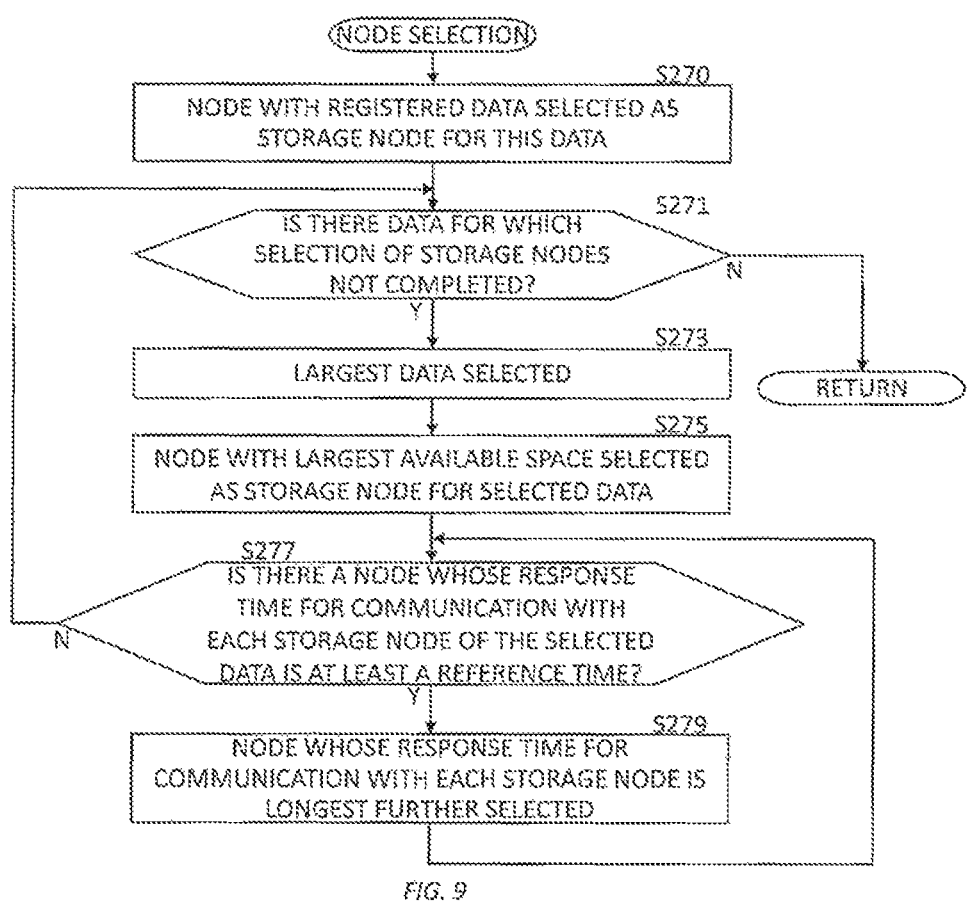
FIG. 9 shows modification of the node selection.

FIG. 9 shows a modification of the node selection of step S17. By performing the process of steps S270 to S279, the node selecting section 232 may select, for each piece of data 51 included in the block 5, a storage node apparatus 2 in which this data 51 is to be stored from among the plurality of node apparatuses 2.

First, at S270, the node selecting section 232 selects, as a storage node apparatus 2 for each piece of data included in the block 5, a node apparatus 2 that has registered this data 51. The process of S270 does not necessarily need to be performed. Furthermore, if a node apparatus 2 that communicated data 51 registered in step S11 or S31 described above has been removed from the blockchain cluster 200, the storage node apparatus 2 does not need to be selected for this data 51 at step S270.

Next, at step S271, the node selecting section 232 judges whether there is data for which the selection of the storage node apparatuses 2 has not been completed among the data 51 included in the block 5. For example, the node selecting section 232 may judge whether there is data 51 for which the number of storage node apparatuses 2 that have been selected is less than the multiplicity (y), among the data 51 included in the block 5. Instead, the node selecting section 232 may judge whether there is data for which the number of storage node apparatuses 2 that have been selected is less than 2, among the data 51 included in the block 5. If this judgment result is negative, i.e. if the selection of the storage node apparatuses 2 has been completed for all of the data 51, the node selecting section 232 ends the node selection. If this judgment result is affirmative, the node selecting section 232 moves the process to step S273.

At step S273, the node selecting section 232 selects the largest piece of data 51 among the one or more pieces of data 51 for which the selection of storage node apparatuses 2 has not been completed.

Next, at step S275, in the same manner as in step S175 described above, the node selecting section 232 selects the node apparatus 2 with the greatest amount of available space, from among the plurality of node apparatuses 2, to be the storage node apparatus 2 for the selected data 51.

Next, at step S277, the node selecting section 232 judges whether there is a node apparatus 2 whose response time for the communication with each storage node apparatus 2 selected for the selected data 51 is greater than or equal to the reference response time. Instead, the node selecting section 232 may judge whether i) there is a node apparatus 2 whose response time for the communication with each selected storage node apparatus 2 for the selected data 51 is greater than or equal to the reference response time and ii) the number of storage node apparatuses 2 for the selected data 51 is greater than or equal to the multiplicity (y). The reference response time may be the same time as used in step S179 described above. Instead, the reference response time may be set to be within an allowable time in a case where an arbitrary piece of data 51 is accessed by an arbitrary node apparatus 2. If this judgment result is affirmative, the node selecting section 232 moves the process to step S271. If this judgment result is negative, the node selecting section 232 moves the process to step S279.

At step S279, the node selecting section 232 selects the node apparatus 2 having the longest response time for the communication with each other storage node apparatus 2 selected for the data 51, as the storage node apparatus 2 of this selected data 51.

Then, when the process of step S279 has ended, the node selecting section 232 moves the process to step S277. In this way, storage node apparatuses 2 are sequentially selected until the response time for the communication between each storage node apparatus 2 selected for the selected data 51 and another arbitrary node apparatus 2 becomes less than at least the reference response time.

With the process described above, the node apparatus 2 with the longest response time for the communication with each storage node apparatus 2 selected for this data 51 is selected as the storage node apparatus 2 of the selected data 51. Accordingly, it is possible to reliably shorten the response time for the communication between the node apparatuses 2 that store this data 51 and the node apparatuses 2 that do not store this data 51. Therefore, it is possible to shorten the time needed to access an arbitrary piece of data 51 from an arbitrary node apparatus 2.

4-2. Modification of Node Apparatus Characteristics

Instead of or in addition to the amount of data 51 registered and/or the communication response time, other characteristics may be used as the characteristics of the node apparatuses 2 used for selecting whether to store data 51 in the node apparatuses 2.

As an example, the characteristic of the node apparatuses 2 may be a predicted referencing frequency of the data 51. In this case, at step S15, the allocation amount determining section 231 may set the allocation amount for a node apparatus 2 whose predicted number of references for at least one piece of data 51 greater than a certain number of references to be the data amount of the block 5, thereby storing all of the data 51 in the block 5 in this node apparatus 2. Furthermore, at step S17, the node selecting section 232 may select, as the storage node apparatus 2 for one piece of data 51 included in the block 5, a node apparatus 2 whose predicted number of references for this one piece of data 51 is greater than the certain number of references. Instead, the node selecting section 232 may select, as the storage node apparatus 2 for one piece of data 51 included in the block 5, a node apparatus 2 whose response time for communication with a node apparatus 2 for which the predicted number of references of this one piece of data 51 is greater than the certain number of references is less than a reference response time. In these cases, it is possible to shorten the time needed to access an arbitrary piece of data 51 from an arbitrary node apparatus 2. Here, the predicted number of references of the data 51 may be predicted by aggregating the number of references of each piece of date 51 registered in the block 5 in the past, according to the content or the like of the data 51, for example. The certain number of references may be an arbitrary number.

The characteristic of the node apparatuses 2 may be the number of node apparatuses 2 adjacent via a network 1, i.e. the order in graph theory. In this case, at step S15, the allocation amount determining section 231 may set the allocation amount for a node apparatus 2 with an order that is higher than a reference order to be the data amount of the block 5, thereby storing all of the data 51 in the block 5 in this node apparatus 2. Furthermore, at step S17, the node selecting section 232 may select the node apparatus 2 whose order is higher than the reference order as the storage node apparatus 2 of one piece of data 51 included in the block 5. Yet further, the node selecting section 232 may select a pair of node apparatuses 2 whose orders are higher than the reference order and are connected by a network 1 serving as a bridge edge in graph theory, as the storage node apparatuses 2 of one piece of data 51 included in the block 5. As an example, if the system 100 is used for Watson Health Cloud, the node apparatuses 2 of a pharmaceutical company and a university may be selected as the storage node apparatuses 2. Instead, the node selecting section 232 may select a node apparatus 2 whose response time for communication with a node apparatus 2 whose order is higher than the reference order is less than the reference response time, as the storage node apparatus 2 of one piece of data 51 included in the block 5. In these cases, it is possible to shorten the time needed to access an arbitrary piece of data 51 from an arbitrary node apparatus 2. The reference order may be an arbitrary value.

The characteristic of the node apparatuses 2 may be mining speed. In this case, at step S15, the allocation amount determining section 231 may set the allocation amount for a node apparatus 2 whose mining speed is greater than a reference speed to be the data amount of the block 5, thereby storing all of the data 51 inside the block 5 in this node apparatus 2. Furthermore, at step S17, the node selecting section 232 may select a node apparatus 2 whose mining speed is greater than the reference speed as the storage node apparatus 2 of one piece of data 51 included in the block 5. Instead, the node selecting section 232 may select, as the storage node apparatus 2 for one piece of data 51 included in the block 5, a node apparatus 2 whose response time for communication with a node apparatus 2 whose mining speed is greater than the reference speed is less than a reference response time. In these cases, it is possible to store the data 51 in the representative node apparatus 2(R) or a member node apparatus 2(M) having a short response time for communication with the representative node apparatus 2(R), and therefore it is possible to reduce the communication load occurring when the data 51 is stored. The reference speed may be an arbitrary speed.

4-3. Other Modifications

In the embodiments and modifications above, the representative node apparatus 2(R) is described as including the allocation amount determining section 231 and the node selecting section 232, but only needs to include one of these. If the representative node apparatus 2(R) does not include the node selecting section 232, the allocation amount determining section 231 may supply the data storage control section 24 with the determined allocation amount. Furthermore, the data storage control section 24 may distribute and store the data 51 inside the block 5 among the node apparatuses 2 according to these allocation amounts.

In the process of step S175, the available space of each node apparatus 2 is described as a value obtained by subtracting the amount of data 51 that is already a storage target of a node apparatus 2 from the allocation amount determined for this node apparatus 2 in the process of step S15. However, if the representative node apparatus 2(R) does not include the allocation amount determining section 231 and the process of step S15 is not performed, a value obtained by subtracting the amount of data 51 that is already a storage target of a node apparatus 2 from the size of the storage region in this node apparatus 2 may be used as the available space of this node apparatus 2.

In the above description, in the process of step S179, a node apparatus 2 whose response time for the communication with each storage node apparatus 2 selected for a piece of data 51 is selected as the storage node apparatus 2 of this selected data 51. However, the node with the longest response time for the communication with each storage node apparatus 2 selected for the selected data 51 may be selected as the storage node apparatus 2.

In the above description, the selecting section 23 of the representative node apparatus 2(R) selects whether to store the data 51 in each node apparatus 2. However, the selecting section 23 of each member node apparatus 2(M) may select whether to store the data 51 in its own node apparatus 2.

Figure 10:
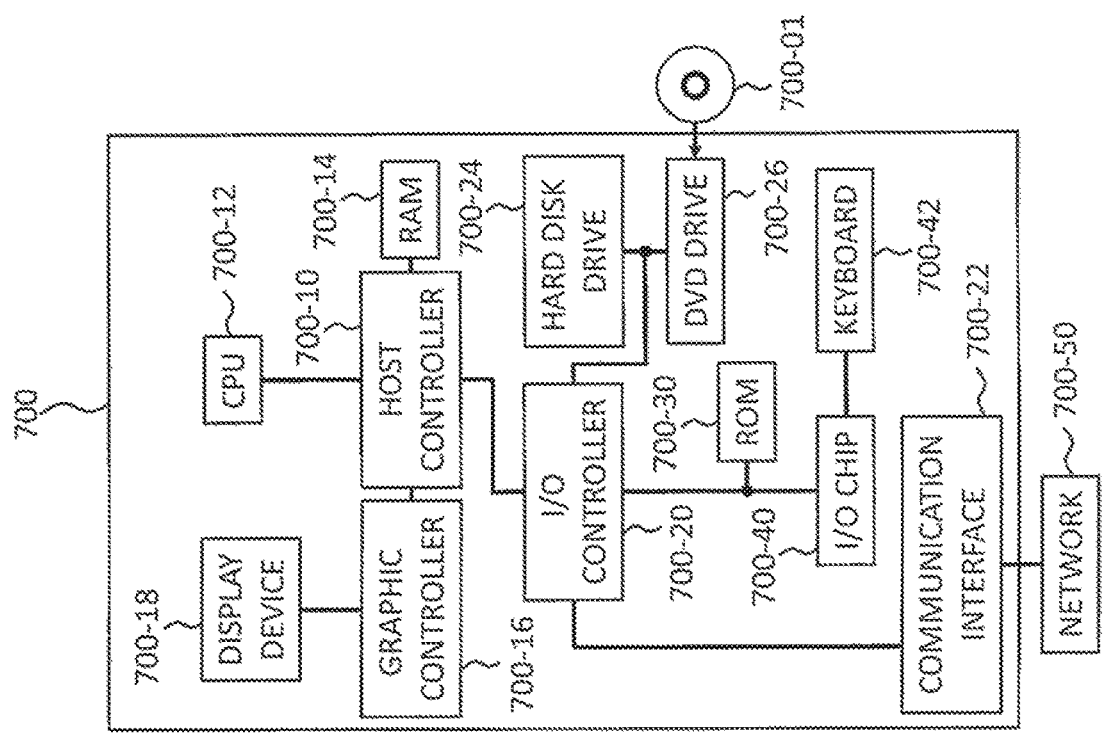
FIG. 10 shows an exemplary hardware configuration of a computer according to the embodiment of the invention.

FIG. 10 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller

700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700.

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above description, with the embodiments of the present invention, it is possible to reduce the load occurring when storing and/or referencing the data 51.

What is claimed is:

1. A method for reducing load in a blockchain system that comprises a plurality of node apparatuses connected in a network, the blockchain system storing at least a portion of data registered in a blockchain in each of the plurality of node apparatuses, the method comprising:
   registering multiple pieces of data to be included in a block of the blockchain;
   creating the block of the blockchain including all of the multiple pieces of data;
   for each of the multiple pieces of data, making a determination of a plurality of storage node apparatuses from among the plurality of node apparatuses in the blockchain system to store each piece of data that was included in the block of the blockchain, the determination based on a characteristic of each of the node apparatuses; and
   storing each of the multiple pieces of data in a selected plurality of the node apparatuses of the blockchain system according to the determination.

2. The method according to claim 1, further comprising generating a list of the storage node apparatuses that store each piece of data according to the determination.

3. The method according to claim 2, further comprising transmitting the list among the plurality of node apparatuses.

4. The method according to claim 2, further comprising:
   storing the list in at least one node apparatus among the plurality of node apparatuses in association with the block.

5. The method according to claim 2, further comprising storing the list for one piece of data included in the block in a node apparatus, among the plurality of node apparatuses, that does not store the one piece of data.

6. The method according to claim 2, further comprising storing the list in each node apparatus among the plurality of node apparatuses.

7. The method according to claim 1, wherein the determination includes determining an allocation amount of data to be stored by each node apparatus according to amounts of data registered by each node apparatus.

8. The method according to claim 7, wherein the determination includes, if the allocation amount of data to be stored in one node apparatus among the plurality of node apparatuses exceeds an upper limit data amount, determining the allocation amount of the one node apparatus to be a new upper limit data amount and adding an excess data amount to the allocation amounts of a plurality of other node apparatuses based on the new upper limit data amount.

9. The method according to claim 8, wherein the upper limit data amount is a data amount of the block.

10. The method according to claim 1, wherein the determination includes selecting, as a storage node apparatus of each piece of data, a node apparatus which has registered that piece of data.

11. The method according to claim 1, wherein the determination includes selecting, as a storage node apparatus, a node apparatus with a largest available space among the plurality of node apparatuses, for a largest piece of data of the block for which selection of a storage node apparatus has not been completed.

12. The method according to claim 1, wherein the determination includes sequentially selecting from among the plurality of node apparatuses, as the storage node apparatuses for one piece of data included in the block, node apparatuses whose response times for communication with each storage node apparatus selected for the one piece of data are longer than a reference response time.

13. The method according to claim 1, wherein the determination includes sequentially selecting node apparatuses whose available spaces are largest as the storage node apparatuses.

14. The method according to claim 1, wherein the determination includes sequentially selecting from among the plurality of node apparatuses, as the storage node apparatuses for one piece of data included in the block, node apparatuses whose response times for communication with each storage node apparatus selected for the one piece of data are longest.

15. The method according to claim 14, wherein the determination includes sequentially selecting the storage node apparatuses until the response time for the communication between each storage node apparatus selected for the one piece of data among the plurality of node apparatuses and another arbitrary node apparatus becomes less than a reference response time.

16. The method according to claim 1, wherein the determination includes selecting a number of the storage node apparatuses equal to at least a multiplicity resulting from multiplexing for each piece of data.

17. The method according to claim 1, wherein the determination includes selecting, as the storage node apparatus for one piece of data included in the block, a node apparatus for which a predicted number of references of the one piece of data is greater than a certain number of references.

18. The method according to claim 1, wherein the determination includes selecting, as the storage node apparatus for one piece of data included in the block, a node apparatus whose response time for communication with a node apparatus for which a predicted number of references of the one piece of data is greater than a certain number of references is less than a reference response time.

19. A system that stores at least a portion of data registered in a blockchain in each of a plurality of node apparatuses, comprising:
    a processor; and
    a computer program product for storing at least a portion of the data registered in the blockchain in each of the plurality of node apparatuses, wherein
    the computer program product includes a non-transitory computer readable storage medium having program instructions embodied therewith, the program instructions executable by the processor to cause the processor to perform operations comprising:
    registering multiple pieces of data to be included in a block of the blockchain;
    creating the block of the blockchain including all of the multiple pieces of data;
    for each of the multiple pieces of data, making a determination of a plurality of storage node apparatuses from among the plurality of node apparatuses to store each piece of data that was included in the block of the blockchain, the determination based on a characteristic of each of the node apparatuses; and
    storing each of the multiple pieces of data in a selected plurality of the node apparatuses of the blockchain system according to the determination.

20. A computer program product for storing at least a portion of data registered in a blockchain in each of a plurality of node apparatuses, the computer program product comprising a non-transitory computer readable storage medium having program instructions embodied therewith, the program instructions executable by a device to cause the device to perform operations comprising:
    selecting whether to store data included in a block in one node apparatus among the plurality of node apparatuses, according to a characteristic of the one node apparatus;
    storing at least a portion of the data included in the block in the one node apparatus, according to a result of the selecting; and
    storing a list of node apparatuses storing each piece of data in the block so that a first node apparatus that does not itself store a first piece of data in the block is enabled to reference that first piece of data on a different node apparatus.

* * * * *